Nov. 8, 1966 M. A. HOEFGEN 3,284,587

METER APPARATUS FOR TELEMETERING SYSTEMS INCLUDING IMPROVED SWITCH CONTACT STRUCTURES

Filed Nov. 16, 1964

3 Sheets-Sheet 1

INVENTOR.
MAX A. HOEFGEN

BY
Widdowson and Stoffel

ATTORNEYS

Nov. 8, 1966 M. A. HOEFGEN 3,284,587

METER APPARATUS FOR TELEMETERING SYSTEMS INCLUDING IMPROVED SWITCH CONTACT STRUCTURES

Filed Nov. 16, 1964

3 Sheets-Sheet 2

INVENTOR.

MAX A. HOEFGEN

BY

Widdowson and Stoffel

ATTORNEYS

Nov. 8, 1966 M. A. HOEFGEN 3,284,587

METER APPARATUS FOR TELEMETERING SYSTEMS INCLUDING IMPROVED SWITCH CONTACT STRUCTURES

Filed Nov. 16, 1964

3 Sheets-Sheet 3

INVENTOR.
MAX A. HOEFGEN

BY

Widdowson and Stoffel

ATTORNEYS 3,284,587

METER APPARATUS FOR TELEMETERING SYSTEMS INCLUDING IMPROVED SWITCH CONTACT STRUCTURES

Max A. Hoefgen, 9502 Shade, Wichita, Kans.

Filed Nov. 16, 1964, Ser. No. 411,364
7 Claims. (Cl. 200—18)

This invention relates to telemetering systems. More specifically, this invention relates to meter apparatus for telemetering systems. Still more specifically, this invention relates to meters and meter attachments for systems enabling the reading of meters from remote locations. Still more specifically, this invention relates to meters, and to meter attachments for existing meters which will make possible the determination of a meter reading over telephone lines and the like and at a central location far removed from meters.

Telemetering devices in general are old in the art. Various attempts have been made in the past to devise a system for reading meters at a telephone subscriber's premises from a telephone central office or other control point. In general, such arrangements provide for the translation of the meter reading into an electrical signal, and for the transmission of the signal over the telephone lines. The potential advantages of such a system include both speed and economy. Additionally, such a system can serve as the core of a fully integrated meter reading, recording, and billing arrangement.

Telemetering systems, and equipment designed for same, known to the prior art have not been entirely satisfactory and practical in operation and have failed to provide the potential advantages noted. The known converter apparatus for meters for producing electrical signals in response and to meter settings used in telemetering systems have caused a great deal of difficulty in operation. The known meter apparatus for producing an electrical signal to be transmitted over telephone lines, or the like, usually consists of complex and intricate mechanisms which are quite expensive to produce, difficult to maintain, and often undependable in operation. In general, these known meter apparatus for producing electrical signals often exert a drag on the meter, which, though usually minute, causes inaccuracy, undependability, and wear in the meter mechanism. To date, the development of telemetering systems has been retarded because a meter apparatus that was rugged, dependable, and inexpensive has not been developed.

My invention is a new meter apparatus for use in a remote reading system or telemetering system. The apparatus of my invention has a frame, a binary coded cam mounted on the frame, and connection means connecting the cam and meter mechanism in driving relationship. A switch means is provided for operative engagement and responsive to the binary coded cam.

A preferred embodiment of my invention is an apparatus for adapting an existing meter to a remote reading system. This apparatus of my invention also consists of a frame, a binary coded cam mounted on the frame, and connection means connecting the cam and the meter in a driving relationship. A switch means having a plurality of contact elements is provided for operative engagement and response to the binary coded cam. Preferably, an electro magnetic means is provided for causing engagement of the switch means and the binary coded cam.

The meter apparatus of my invention for use in telemetering systems overcomes all of the disadvantages of the meter apparatus for such systems known to the prior art. The meter apparatus of my invention is simple in operation, thereby simplifying the installation and maintenance of meter apparatus, and does not exert a drag on the meter mechanism during normal operation of the meter between readings. Further, my meter apparatus can be either embodied in meters particularly designed for use in telemetering systems, or can be utilized to modify existing meters by direct attachment to same. A preferred specific embodiment of the meter apparatus of my invention can be simply and easily attached to a conventional meter having only dials for indicating the reading of the meter. My meter apparatus is also very dependable in operation since it does not embody complex mechanical linkages and other complex mechanism therein. Another great advantage of the meter apparatus of my invention is that it is very low in initial cost and also relatively inexpensive to maintain in proper working operation. The meter apparatus of my invention consists of a minimum of moving parts which parts are very simple to install on an existing conventional meter.

An object of my invention is to provide new apparatus for telemetering systems.

Another object of my invention is to provide a new meter attachment adapted for installation on conventional meters to adapt them to telemetering systems.

Yet another object of my invention is to provide a new meter apparatus for telemetering systems which is adapted in operation to produce an electrical signal with a binary coded cam means that can be received at a remote location and interpreted to convey the meter reading indicated by the meter.

Another object of my invention is to provide a new meter apparatus for use in telemetering systems having an electrical switch means that can be selectively activated from a remote location to produce an electrical signal which can be decoded and transmitted to convey the meter reading.

Yet another object of this invention is to provide a new meter apparatus that is simple and dependable in operation.

Another object of this invention is to provide a new meter attachment for telemetering systems which does not exert any appreciable drag on the meter mechanism between readings.

Yet another object of my invention is to provide a new attachment for conventional meters that can be mounted on the meter to adapt it for use in a telemetering system.

Yet another object of my invention is to provide a new meter apparatus for use in telemetering systems that is relatively inexpensive to produce and maintain in operation.

Still another object of my invention is to provide a new meter apparatus particularly adapted for telemetering systems which can serve as the core for a fully integrating meter reading and billing arrangement.

Other objects and advantages of the new meter reading apparatus of my invention will become apparent to one skilled in the art upon reading the disclosure. Drawings accompany and are a part of this disclosure. These drawings depict perferred specific embodiments of the new meter apparatus of my invention and it is to be understood that such drawings are not to unduly limit the scope of my invention. In the drawings, FIG. 1 is an exploded view in perspective illustrating the relationship of the binary coded cam means and its attachment to a conventional meter.

Figure 1:
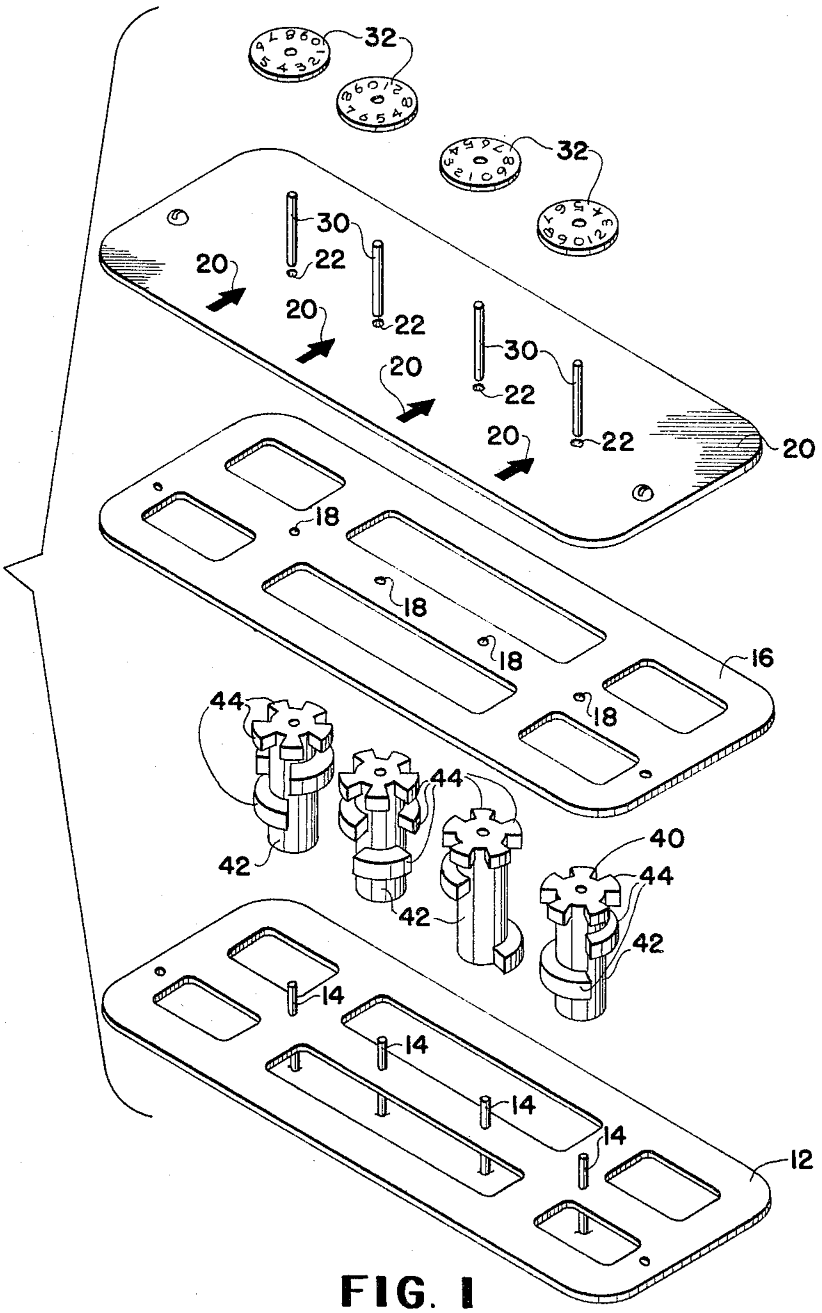

The following is a discussion and description of the new meter apparatus of my invention made with reference to the drawings, wherein the same reference numerals are used to indicate the same or similar parts and/or structure. The discussion and description of preferred specific embodiments of the new meter apparatus of my invention, and it is to be understood that such is not to unduly limit the scope of my invention.

Referring now to the drawings, FIGS. 1 through 8, there is illustrated a preferred specific embodiment of my invention, namely an apparatus for adapting a conventional meter for use in a telemetering system. The meter apparatus is adapted for mounting on a conventional meter having a base plate 12, a plurality of dial faces, and a corresponding plurality of parallel rotatable drive shafts 14 protruding through base plate 12. In the various figures of the drawings the details of the conventional meter have been deleted and only the base plate 12 and shafts 14 are illustrated. The apparatus 10 of the invention includes a face plate 16 having a plurality of spaced apertures 18 positioned in alignment with drive shafts 14 of the meter. Preferably, a cover plate 20 is secured in overlying relationship to face plate 16. The cover plate is preferably provided with numeral indicators 20 as most clearly shown in FIG. 1 of the drawings. Often the cover plate 20 and dials can be removed from the meter and used in the apparatus 10 of my invention. Cover plate 20 is also provided with apertures 22 positioned in alignment with apertures 18 in face plate 16 and the shafts of the meter. Two spacer brackets 24 are secured at their end portions to the face plate and cover plate 20 with bolts 26. The opposite ends of the two spacer brackets are secured to the base plate 12 of the meter with bolts 28. As is apparent in FIG. 5 of the drawings the two spacer brackets maintain the base plate 12 and the face plate 16 in rigid spaced and parallel relationship. A plurality of dial shafts 30 are rotatably mounted in apertures 18 and 22 of face plate 16 and cover plate 20, respectively. A plurality of dials 32 are rigidly mounted on the ends of the respective dial shafts 30 in overlying relationship to the face plate and cover plate. The dials 32 in combination with numeral indicators 20 make it possible to manually take a reading of the meter.

A binary coded cam means 40 is provided in my meter apparatus. The binary coded cam means consists of a plurality of drums 42 of electrically insulating material positioned between the base plate 12 and face plate 16 and secured on drive shafts 14 of the meter. The lower ends of the dial shafts 30 are also secured to the upper ends of the drums 42, which relationship is most clearly illustrated in FIG. 5 of the drawings. Radially extending camming projections 44 are provided on drums 42 and arranged to present consecutive numerical values in the binary code system along angular portions of the drum. The binary system of representing integers is relatively old in the art and will not be described in detail here. It will suffice to say that the various integers from 1 to 9 can be expressed as combinations of the base 2 taken to the zero, first, second, or third power. For example, 7 can be expressed as 2 to the zero power, plus 2 to the first power, plus two to the second power. In FIG. 1, the top row of radially extending projections 44 represent 2 taken to the zero power. The second row of projections represent 2 to the first power, the third row representing 2 to the second power, and the fourth row 2 to the third power. The various rows can be rearranged in any suitable manner if desired. The radially extending projections 44 on drum 42 are positioned on dial shaft 30 so that the various digits are in overlying relation due to the respective numerical integers indicated by the respective camming projections as expressed in the binary code.

An electrical switch means is provided for sensing the angular positions of the projections 44 on drums 42 and producing an electrical signal reflecting same. Two channel shaped guide elements 46 are mounted in opposing relation on the spacer brackets 24. The guide brackets can be secured to the spacer brackets with a bolt 47, rivet, or the like. Two iron blocks 48 are slidably disposed in the guide elements 46. The electrical switch means includes a rectangular shaped switch mounting plate 50 of electrical insulating material secured to blocks 48. The mounting plate 50 has a plurality of rectangular shaped apertures 52 therein positioned adjacent each drum 42. Preferably two channel guide slots 54 are also provided to receive the sides of channel guide 46 when the switch plate is mounted in operative position thereon. In each aperture 52 are provided four flexible switch contacts 56. The switch contact arms are mounted on the switch plate 50 with bolts or rivets 57. The contact arms 56 each have a transverse portion 58 positioned to selectively contact the respective projections 44 of drum 42. As most clearly indicated in FIG. 2 of the drawings, the switch contact arms 56 are arranged on the mounting plate 52 in first, second, third and fourth sets. Each set of switch arms consists of one contact arm in each of the apertures 52 positioned to be operatively engaged with the same respective set of projections. The first set comprises the upper row of switch arms, the second set the second row, the third set the third row, and the fourth set the fourth or bottom row.

Figures 2, 3:
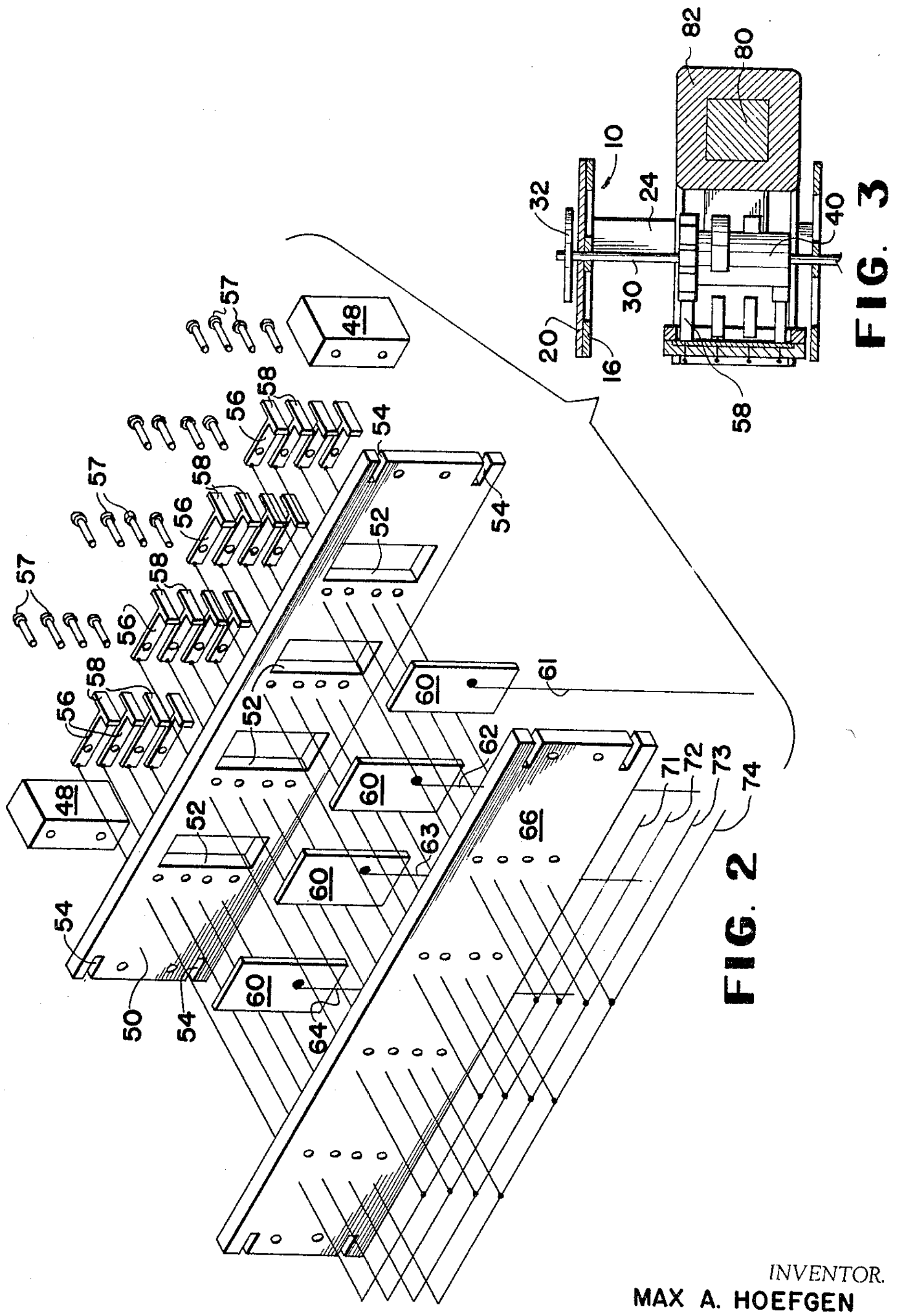
FIG. 2 is an exploded view in perspective illustrating the relationship of the various elements of the switching means of my apparatus.
FIG. 3 is a cross sectional view taken on line 3—3 of FIG. 6.
Figure 4:
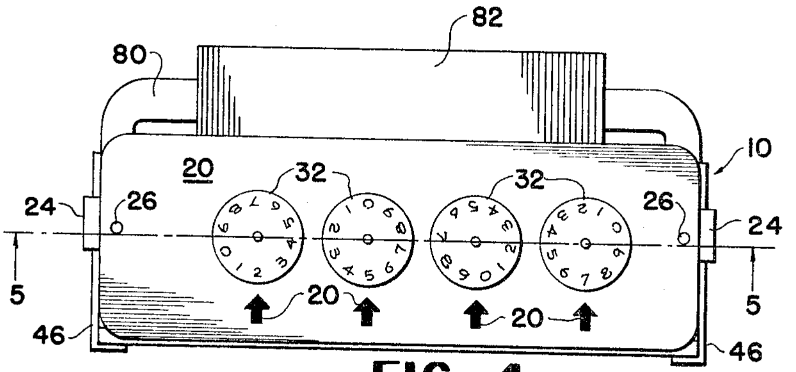
FIG. 4 is a top view of a preferred specific embodiment of the meter apparatus of my invention.

A plurality of metal contact plates 60 are mounted on the mounting plate 50 overlying each of the apertures 52. As illustrated in FIG. 2, the metal contact plates are mounted on the opposite side of the plate from the switch arms 56. Terminal means 61, 62, 63 and 64 are provided for each of the contact plates 60. A cover plate 66 is secured to the mounting plate 50 in overlying relation to the contact plates. The transverse portion 58 of the switch arms 56 are positioned in spaced relation to the metal contact plates 60 when the arms are in relaxed unrestrained position. There is no electrical contact between the switch arms 56 and the metal plates unless a force is applied to the transverse end portion 58 of the switch arms. A terminal means is provided for each of the first, second, third, and fourth sets of contact arms, namely terminal means 70, 71, 72, 73 and 74.

Figures 5, 6, 7, 8:
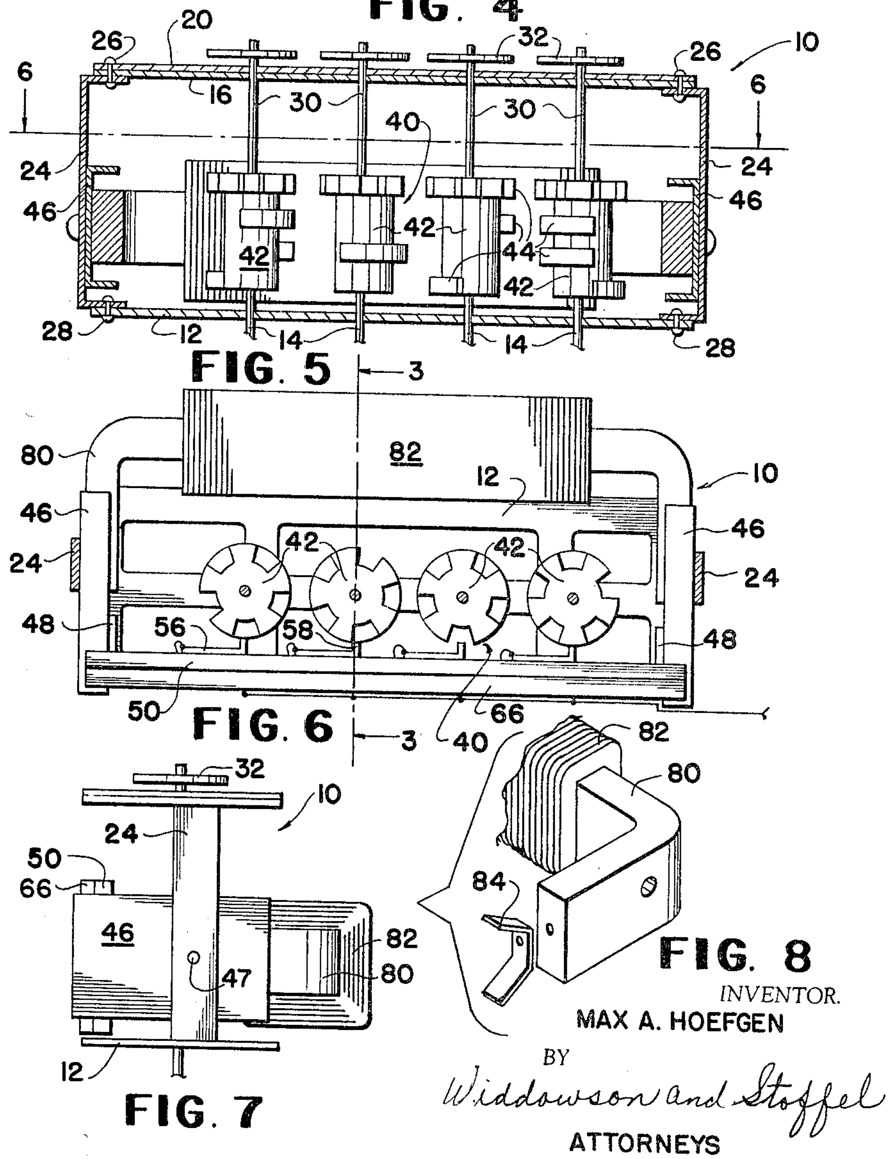
FIG. 5 is a cross sectional view taken on line 5—5 of FIG. 4.
FIG. 6 is a cross sectional view of the meter apparatus of my invention taken on line 6—6 of FIG. 5.
FIG. 7 is a side elevational view of my meter apparatus.
FIG. 8 is a perspective view in broken cross section of a portion of the electro-magnetic core means of my invention.

A U-shaped magnetic iron core 80 is secured to the guide elements 56 with the ends thereof positioned in spaced relation to iron blocks 48. A coil 82 is disposed about the intermediate portion of core 80 and suitable terminal means are provided. A compression spring 84 shown most clearly in FIG. 8 are mounted to the ends of core 80 and adapted to urge the iron blocks 48 and the core apart. It can be seen that connecting a source of electrical current to the coil 82 surrounding core 80 transforms the combination into an electro-magnet. When the electro magnetic force is applied the iron blocks 48 are drawn toward the ends of the core moving the switch plate 50 and the assembly mounted thereon into engagement with the binary coded cams 40. Various switch arms 56 will thereby become bent against the metal contact plates 60 depending on positions of the projections 44 on the drums 42.

The overall telemetering system with which the meter apparatus of my invention can be utilized is old and will not be described in detail herein. It will suffice to say that electrical terminals 61, 62, 63, 64, 71, 73 and 74 can be shorted in various combinations of the 16 possibilities. The shorting or forming of an electrical contact between the various switch arms will be connected to an associated apparatus which will generate various combinations of frequencies. The number and types of frequencies are determined by the number and combination of the electrical contacts formed by the cam means. The frequencies can be transmitted over the telephone line or other means of transmission and received at a remote location. At this location the frequencies can be used to activate various tuned circuits causing relays to operate in a manner that exactly duplicates the original condition set up by the cams. As previously stated the telemetered information can be used to read the meter, or can be incorporated into a fully integrated meter reading, recording and billing arrangement.

As will be obvious to those skilled in the art various changes and modifications of the preferred meter apparatus of my invention as described herein can be made or followed without departing from the spirit of the disclosure or the scope of the claims.

I claim:

1. A meter having a base plate, a plurality of dial faces, and a corresponding plurality of parallel rotatable drive shafts supporting said dial faces protruding through said base plate to a remote reading system comprising, a face plate having a plurality of spaced apertures positioned in alignment with the drive shafts, two spacer brackets, means for securing the opposite ends of said spacer brackets to said base plate and said face plate maintaining same in rigid spaced relation, a plurality of dial shafts rotatably mounted in said apertures in said face plate, a plurality of dial faces rigidly mounted on the ends of the respective dial shafts in overlying relation to said face plate, binary coded cam means comprising, a plurality of drums of electrical insulating material positioned between said base plate and said face plate, means for securing said drums to said drive shafts of said meter and to said dial shafts, and radially extending camming projections on each drum arranged to present consecutive numerical values in the binary code system along angular positions of said drum, an electrical switch means for sensing the angular positions of said drums comprising, two channel shaped guide elements mounted in opposing relation on said spacer brackets, two iron blocks slidably disposed on said guide elements, a rectangular shaped switch mounting plate of electrical insulating material secured to said blocks, and having a plurality of rectangular apertures therein adjacent each drum, four flexible switch contact arms mounted in overlying relation to each rectangular aperture, said contact arms having a first end secured to said mounting plate and having a transverse portion on the opposite end positioned to selectively contact the respective projection on said drum, said switch contact arms arranged on said mounting plate in first, second, third, and fourth sets, each of said sets comprised of one switch contact arm in each one of said plurality of apertures, a plurality of metal contact plates mounted on said mounting plate overlying said plurality of apertures, individual terminal means for each of said contact plates, a cover plate of electrical insulating material secured to said mounting plate overlying said contact plates, first terminal means in common electrical contact with the first set of contact arms, second terminal means in common electrical contact with the second set of contact arms, third terminal means in common electrical contact with said third set of contact arms, fourth terminal means in common electrical contact with said fourth set of contact arms, a U-shaped magnetic iron core secured to said guide elements with the ends positioned in spaced relation to said iron blocks, a coil disposed about the intermediate portion of said core, compression springs mounted on the ends of said core adapted to urge said iron blocks and core apart, said apparatus in operation in a data transmission system adapted to produce an electrical signal when the switch mounting plate is urged by the magnetic core into contact with the binary coded cam means to selectively cause electrical contacts between the switch arms and contact plates that can be received at a remote location and interpreted to convey the meter reading indicated by said dials.

2. A meter having a base plate, a plurality of dial faces, and a plurality of rotatable drive shafts supporting said dial faces protruding through said base plate to a remote reading system comprising, a face plate having a plurality of spaced apertures positioned in alignment with the drive shafts, spacer bracket means maintaining said face plate in spaced and parallel relation to said base plate of said meter, a plurality of dial shafts rotatably mounted in said apertures in said face plate, binary coded cam means comprising, a plurality of drums positioned between the base plate and said face plate and secured to the drive shafts on said meter and to said dial shafts, and radially extending camming projections on each drum arranged to present consecutive numerical values in the binary code system along angular positions of said drum, an electrical switch means for sensing angular positions of said drums comprising, spaced guide elements positioned transverse to the longitudinal axes of said drums, iron blocks slidably disposed on said guide elements, a switch mounting plate secured to said box, said mounting plate having a plurality of aligned apertures therein adjacent said drums, four flexible switch contact arms mounted in overlying relation to each of said apertures, each of said contact arms having a first end secured to said mounting plate and a transverse portion on the opposite end positioned to selectively contact the respective projection on said drum, said switch contact arms arranged on said mounting plate in first, second, third, and fourth sets, each of said sets comprising one switch contact arm in each one of said plurality of apertures, a plurality of metal contact plates mounted on said mounting plate overlying said plurality of apertures, individual terminal means for each of said contact plates, first terminal means in electrical contact with said first set of contact arms, second terminal means in electrical contact with said second set of contact arms, third terminal means in electrical contact with said third set of contact arms, fourth terminal means in electrical contact with said fourth set of contact arms, a U-shaped iron core secured to said guide elements, a coil disposed about said core, compression means positioned between said core and said iron blocks adapted in use to urge same apart, said apparatus in operation in a data transmission adapted to produce an electrical signal when the switch mounting plate and contact arms are urged by the core and coil into contact with the binary coded cam means, which signal can be received at a remote location and interpreted to convey the meter reading.

3. A meter having a plurality of drive shafts for supporting dial faces, comprising, a frame mountable on said meter in overlying relationships to said drive shafts, binary coded cam means comprising, a plurality of drums mounted in said frame, means securing said plurality of drums to the drive shafts of said meter, and radially extending cam projections on each drum arranged to present consecutive numerical values in the binary code system along angular positions of said drum, an electrical switch means for sensing the angular positions of said drums, comprising, guide means on said frame, a switch mounting plate slidably mounted on said guide means having a plurality of apertures adjacent each end, four flexible switch contact arms mounted in overlying relation to each aperture, said contact arms having a first end secured to said mounting plate and having a transverse portion positioned to selectively contact the respective projections on said drum, said switch contact arms arranged on said mounting plate in first, second, third and fourth sets, each of said sets comprised of one switch contact arm in each of said apertures, a plurality of metal contact plates overlying said plurality of apertures, terminal means for each of said contact plates, terminal means in electrical contact with the first set of contact arms, terminal means in electrical contact with the second set of contact arms, third terminal means in electrical contact with said third set of contact arms, fourth terminal means in electrical contact with said fourth set of contact arms, electromagnetic means mounted on said frame adapted to shift said mounting plate into engagement with said binary coded cam means, said apparatus in operation in a data transmission system adapted to facilitate production of electrical signals that can be received at a remote location and interpreted to convey the meter reading.

4. A meter having a plurality of rotatable drive shafts connected to a remote reading system comprising, a frame mountable on said meter in overlying relation to said drive shafts, a plurality of binary coded cams mountable on said plurality of drive shafts positioned in said frame, an electrical switch means for sensing the angular positions of said cams comprising, guide means mounted on said frame, a switch mounting plate slidably mounted on said guide means, four flexible contact arms mounted on said plate positioned in operative engagement to each of said cams, said contact arms having a first end secured to said mounting plate and having a transverse portion positioned to selectively contact the respective camming projection on said cam, said switch contact arms arranged on said mounting plate in first, second, third, and fourth sets, each of said sets comprised of one switch contact arm associated with each cam, a plurality of contact plates mounted in spaced relation to said arms, terminal means on each of said contact plates, first terminal means in electrical contact with said first set of contact arms, second terminal means in electrical contact with said second set of contact arms, third terminal means in electrical contact with said third set of contact arms, fourth terminal means in electrical contact with said fourth set of contact arms, electro-magnetic means on said frame adapted to selectively urge said mounting plate into operative engagement with said binary coded cams, said apparatus in operation in a data transmission system adapted to produce an electrical signal that can be received at a remote location, and interpreted to convey the meter reading.

5. A meter for use in a remote reading system comprising, a means for measuring the quantity flow of a medium, drive means connected to said means for measuring the quantity flow having a plurality of drive shafts, means supporting said drive shafts, binary coded cam means mounted on said drive shafts comprising, a plurality of drums secured to said plurality of said drive shafts, and radially extending camming projections arranged to present consecutive numerical values along the angular positions of said drum, an electrical switch means for sensing the angular positions of said drums comprising, guide means mounted on said meter, and iron blocks slidably mounted on said guide means, a switch mounting plate secured to said iron block, four flexible switch contact arms mounted in overlying operative relation to each one of said plurality of drums, each of said contact arms having a first end secured to said mounting plate and having a transverse portion on the opposite end positioned to selectively engage the projections on said drum, said switch contact arms arranged on said mounting plate in first, second, third and fourth sets, each of said sets comprised of one switch contact arm associated with each one of said drums, a plurality of metal contact plates mounted on said mounting plate adjacent said contact arms, individual terminal means for each of said contact plates, first terminal means in common electrical contact with said first set of contact arms, second terminal means in common electrical contact with the second set of contact arms, third terminal means in common electrical contact with said third set of contact arms, and fourth terminal means in common electrical contact with said fourth set of contact arms, electro-magnetic means on said meter positioned to actuate said iron block on said guide means, to thereby urge said mounting plate into engagement with said binary coded cam means, said meter in operation in a data transmission set system adapted to produce an electrical signal that can be received at a remote location and interpreted to convey the meter reading.

6. A meter connected to a remote reading system comprising, a frame mountable on said meter, binary coded cam means comprising, a plurality of drums positioned in said frame, and extending camming projections on each drum arranged to present new consecutive numerical values in the binary code system along angular positions of said drum, drive means connectible to said meter for rotating said plurality of drums, an electrical switch means for sensing the angular positions of said drums comprising, guide means mounted on said frame, a switch mounting plate slidably mounted on said guide means, a plurality of switch contact arms mounted on said plate, said contact arms having a first end secured to said mounting plate and having a transverse portion positioned to selectively contact the respective projections on said drum, said switch contact arms arranged on said mounting plate in a plurality of sets, each of said sets comprised of one contact arm in operative engagement with each drum of said plurality of drums, a plurality of metal contact plates mounted on said mounting plate in spaced engagement to said contact arms, terminal means for each of said contact plates, terminal means for each of said plurality of sets of contact arms, electro-magnetic means on said meter positioned to selectively urge said mounting plate into operative engagement with said binary coded cam means, said meter in operation in a data transmission system adapted to produce an electrical signal that can be received at a remote location and interpreted to convey the meter reading.

7. A meter having a plurality of drive shafts connected to a remote reading system comprising, a frame mountable on said meter, binary coded cams mountable on said drive shafts positioned in said frame, electrical switch means for sensing the positions of said cams comprising, guide means mounted on said frame, a switch mounting plate movably mounted on said guide means, contact arms mounted on said plate and positioned in operative engagement to said cams, said contact arms secured in one end portion to said mounting plate and having another portion positioned to contact the camming projections on said cams, said contact arms arranged on said mounting plate in sets, said sets comprised of a contact arm associated with said cams, a plurality of contact plates mounted in opertaive relation to said arms, terminal means on said contact plates, terminal means for said sets of contact arms, electro-magnetic means mounted in operative relation to said meter and adapted to urge said mounting plate into operative engagement with said binary coded cams, said meter in operation in a data transmission system adapted to produce an electric signal that can be received at a remote location, and interpreted to convey a meter reading.

References Cited by the Examiner

UNITED STATES PATENTS

| | | | |
|---|---|---|---|
| 2,344,254 | 3/1944 | Leathers et al. | |
| 2,845,616 | 7/1958 | Lester | 340—204 X |
| 3,157,752 | 11/1964 | Eichacker | 200—18 |

ROBERT K. SCHAEFER, *Primary Examiner.*

R. S. MACON, *Examiner.*

J. R. SCOTT, *Assistant Examiner.*